United States Patent
Maurel et al.

(10) Patent No.: US 10,221,901 B2
(45) Date of Patent: Mar. 5, 2019

(54) ELECTRICAL ACTUATOR FOR VEHICLE TRANSMISSION SYSTEM

(71) Applicant: VALEO EMBRAYAGES, Amiens (FR)

(72) Inventors: Hervé Maurel, Amiens (FR); Pascal Maurel, Paris (FR)

(73) Assignee: Valeo Embrayages, Amiens (FR)

( * ) Notice: Subject to any disclaimer, the term of this patent is extended or adjusted under 35 U.S.C. 154(b) by 1177 days.

(21) Appl. No.: 14/509,677

(22) Filed: Oct. 8, 2014

(65) Prior Publication Data

US 2015/0096863 A1  Apr. 9, 2015

(30) Foreign Application Priority Data

Oct. 9, 2013 (FR) ..................... 13 59775

(51) Int. Cl.
| | |
|---|---|
| *F16D 28/00* | (2006.01) |
| *H02P 6/08* | (2016.01) |
| *B60L 1/00* | (2006.01) |
| *B60L 3/00* | (2019.01) |
| *B60L 11/14* | (2006.01) |
| *B60L 15/02* | (2006.01) |
| *B60L 15/20* | (2006.01) |
| *H02P 7/03* | (2016.01) |

(52) U.S. Cl.
CPC .............. *F16D 28/00* (2013.01); *B60L 1/003* (2013.01); *B60L 3/0061* (2013.01); *B60L 3/0084* (2013.01); *B60L 11/14* (2013.01); *B60L 15/025* (2013.01); *B60L 15/20* (2013.01); *H02P 6/08* (2013.01); *H02P 7/05* (2016.02); *B60L 2210/10* (2013.01); *B60L 2210/40* (2013.01); *B60L 2220/12* (2013.01); *B60L 2220/14* (2013.01); *B60L 2240/421* (2013.01); *B60L 2240/423* (2013.01); *B60L 2240/425* (2013.01); *B60L 2270/145* (2013.01); *Y02T 10/643* (2013.01); *Y02T 10/70* (2013.01); *Y02T 10/7077* (2013.01); *Y02T 10/7216* (2013.01); *Y02T 10/7241* (2013.01); *Y02T 10/7275* (2013.01)

(58) Field of Classification Search
CPC ...... H02P 27/06; H02P 29/0241; H02J 3/383; H02M 2001/007
See application file for complete search history.

(56) References Cited

U.S. PATENT DOCUMENTS

| | | | | |
|---|---|---|---|---|
| 4,768,636 A | * | 9/1988 | Ito ......................... | B60W 10/02 192/222 |
| 5,362,222 A | * | 11/1994 | Faig ..................... | B29C 45/7666 264/40.3 |
| 5,959,430 A | * | 9/1999 | Yuki ....................... | H02P 21/09 318/805 |
| 8,201,469 B2 | * | 6/2012 | Akashi .................... | F16H 3/006 74/329 |
| 2009/0251831 A1 | * | 10/2009 | Shiba ...................... | B60L 3/003 361/30 |
| 2010/0125385 A1 | * | 5/2010 | Ogawa ................... | B62D 5/008 701/31.4 |
| 2010/0131164 A1 | * | 5/2010 | Carter ................. | B60L 11/1805 701/61 |
| 2010/0181949 A1 | * | 7/2010 | Bates ....................... | H02P 1/04 318/400.09 |
| 2011/0309779 A1 | * | 12/2011 | Hiti ....................... | B60L 3/0061 318/400.27 |
| 2012/0261078 A1 | * | 10/2012 | Adams ...................... | E06B 9/32 160/6 |
| 2013/0002184 A1 | * | 1/2013 | Bates ....................... | H02P 1/04 318/495 |
| 2013/0046426 A1 | * | 2/2013 | Tsukashima .......... | B60L 3/0038 701/22 |
| 2014/0375237 A1 | * | 12/2014 | Wang ....................... | H02P 7/00 318/400.15 |
| 2015/0357934 A1 | * | 12/2015 | Hirsch ................ | H02M 7/5395 318/400.02 |

* cited by examiner

*Primary Examiner* — Shawki S Ismail
*Assistant Examiner* — Zoheb Imtiaz
(74) *Attorney, Agent, or Firm* — Berenato & White, LLC

(57) ABSTRACT

An actuator for a vehicle transmission system, comprising:
- an electrical machine comprising an armature and an inductor,
- a static converter comprising a plurality of commutation cells, the static converter being arranged so as to electrically connect the electrical circuit of the armature to an electrical energy source, and
- a system for controlling the commutation cells of the static converter, said system being configured so that the torque constant of the electrical machine can assume at least two different values depending on the control applied to said cells.

28 Claims, 5 Drawing Sheets

Fig. 11

ELECTRICAL ACTUATOR FOR VEHICLE TRANSMISSION SYSTEM

CROSS-REFERENCE TO RELATED APPLICATIONS AND CLAIM TO PRIORITY

This application claims priority to Patent Application No. 1359775 filed Oct. 9, 2013 in France, the disclosure of which is incorporated herein by reference and to which priority is claimed.

FIELD OF THE INVENTION

The present invention relates to an electrical actuator for a vehicle transmission system.

The invention is applicable in particular, but not exclusively, to the actuation of a single or double clutch whose inactive state can be normally engaged or normally disengaged; to the actuation of a gearbox synchronizer for a manual transmission; to the actuation of an automated gearbox; to the actuation of a double-clutch manual gearbox; or also to the actuation of a clutch for coupling a heat engine to an electrical machine when the latter two are part of a drive train of a hybrid vehicle.

BACKGROUND OF THE INVENTION

A transmission system of this kind is assumed to have several configurations: a configuration in which it allows transmission of a motion, i.e. it is in the engaged state; and a configuration in which said transmission does not occur, i.e. it is in the disengaged state. The electrical actuator thus makes it possible, via an electric motor, to hold the transmission system in at least one of said configurations, and to transition from one to the other of said configurations.

Holding the transmission system in a configuration using the actuator requires the latter to exert a holding torque on the transmission system, and the exertion of said torque is associated with supplying electricity to the actuator motor by way of a holding current. In order to reduce the size of the electrical energy source dedicated to supplying electricity to the motor, it is important for said holding current to be low. In addition, since said holding current can cause heating in the motor due to the Joule effect, reducing said current allows a reduction in the risk of premature wear on the actuator or even destruction thereof by fire. Said holding current I can be associated, by way of a constant K, with the electromagnetic torque T exerted on the electric motor via the equation T=K*I; this requires that the motor be dimensioned so that the constant K has a high value.

The transmission system's transition from one to the other of the above configurations must be performed quickly in the interest of a satisfactory response to a setpoint. Such quickness requires that the motor be capable of achieving high speeds, which requires a constant K having a low value.

Implementation of an electrical actuator allowing a reduction in the holding current while responding satisfactorily to dynamic setpoints thus involves meeting contradictory requirements.

To this end, it is known to combine an electric motor of small size with a reduction gearbox having a mechanically variable ratio, in order to adapt the speed and the current of the electric motor in response to setpoints, and having a wear takeup system for the transmission system. It is furthermore known to combine an electric motor of small size with a fixed-ratio reduction gearbox having an elastic system providing specifically the required power output to the motor, and having a wear takeup system for the transmission system.

Such solutions are complicated to implement and require the addition of specific parts including a wear takeup system for the transmission system, and are consequently costly and bulky.

SUMMARY OF THE INVENTION

The invention aims to provide the advantage of an electrical actuator for a transmission system which meets the aforementioned needs while eliminating the disadvantages of known solutions.

According to one of its aspects the invention achieves this by means of an actuator for a vehicle transmission system, comprising:

- an electrical machine comprising an armature and an inductor, the machine being such that the ratio between a variable representing the electromagnetic torque T exerted on the machine and a variable representing the current I flowing in the electrical circuit of the armature involves a constant K, K being the torque constant of the electrical machine,
- a static converter comprising a plurality of commutation cells, the static converter being arranged so as to electrically connect the electrical circuit of the armature to an electrical energy source, and
- a system for controlling the commutation cells of the static converter, said system being configured so that the torque constant K of the electrical machine can assume at least two different values depending on the control applied to said cells.

In the case of a cogging synchro machine, the electromagnetic torque is then proportional to the square of the current; the invention remains valid and applicable even in this case.

The above ratio can be a linear or affine ratio between the electromagnetic torque T exerted on the machine and the current I flowing in the electrical circuit of the armature, for example in the case in which the electrical machine is a DC machine, as will become evident below. The equation is then expressed as $$T = K \times I + T_0,$$

where $T_0$ is zero as applicable.

As a variant, the above ratio can be a linear or affine ratio between the electromagnetic torque T exerted on the machine and a current I' mapped via one or more mathematical transformations, for example Clarke's and Park's, from the current I flowing in the electrical circuit of the armature, for example in the case in which the electrical machine is a synchronous machine, as will become evident below.

The equation is then expressed as $$T = K \times I' + T_0',$$

where $T_0'$ is zero as applicable.

As a further variant, the above ratio can be a quadratic relationship between the electromagnetic torque T exerted on the machine and the current I flowing in the electrical circuit of the armature, for example in the case in which the electrical machine is a synchro cogging machine, as will become evident below.

The ratio is then expressed as $$T = K \times I^2 + T_0'',$$

where $T_0''$ is zero as applicable.

Each value of the torque constant can correspond to a different operating mode of the actuator. The transition from one to the other of these operating modes is then achieved by modifying how the commutation cells are controlled. In other words, unlike approaches of the existing art, the actuator's capability of having at least two different operating modes does not require resorting to a complex physical architecture and selective utilization of some of the elements of that architecture depending on the desired operating mode of the actuator. According to the invention a single and identical physical architecture, control of which is modified as necessary, provides the advantage of an actuator having at least two different operating modes.

The control system can be configured so that the torque constant K of the electrical machine has a high value, so that the value of the current being supplied to the electrical machine can be reduced without thereby affecting the value of the torque exerted by the actuator on the transmission system. This high value is useful, for example, for maintaining the state of the transmission or for displacing the actuator slowly.

The actuator can comprise a reduction gearbox, and the latter can have a fixed reduction ratio selected as a function of the maximum power output applied by the transmission system to the actuator, in order to reduce the electromagnetic torque that needs to be applied to the rotor of the electrical machine when it is holding the transmission system in a given state.

This fixed reduction ratio advantageously allows a compromise to be achieved between
  the greatest possible reduction in the electromagnetic torque value corresponding to the maximum power output applied by the transmission system and mentioned above, and
  a minimal travel or number of revolutions allowing the actuator to cover the actuation travel, from its inactive position toward a position in which it holds the transmission system in the given state, in as short a time as possible.

This fixed value for the reduction ratio makes it possible, for example, to reduce by 25% to 50% the electromagnetic torque value allowing said holding, as compared with the electromagnetic torque value to be provided by the actuator having a reduction gearbox allowing displacement of the actuator from its inactive position to the holding position in an allotted time of, for example, between 80 and 150 ms for a clutch and between 30 and 60 ms for a synchronizer actuator. With a reduction gearbox of this kind it is possible to decrease even further the current value needed when the actuator is in this operating mode. This is because when the torque value that the actuator must exert is reduced for a given high value of the torque constant K, the value of the current being supplied to the electrical machine is further reduced. The amount of current withdrawn from an electrical energy source is thus significantly lowered. The high value of the torque constant K associated with the value of the reduction gearbox reduction ratio can make it possible to withdraw from the electrical energy source, for example the battery of the onboard electrical system, a current of only 1 A to 2 A in order to supply the electrical machine.

The reduction of 25% to 50% in said value of the holding torque thanks to the selection of the reduction ratio nevertheless causes a demultiplication of the distance to be traveled at the motor in order to displace the actuator from its inactive position to the position in which it holds the transmission system in the given state. To avoid an increase in the time required for displacement over this actuator travel, an electrical machine capable of rotating two to four times faster would be necessary. The control system can be configured so that the torque constant K of the electrical machine has at least one low value. This or these low value(s) can correspond to an operating mode that is a fast displacement of the actuator, for example in order to comply with a change in setpoint. In this operating mode of the actuator, the electrical current supplied to the electrical machine is higher. This operating mode can correspond to transient operation of the actuator.

When the fixed value of the reduction ratio is selected as mentioned above, the 25% to 50% reduction in the value of the holding torque brought about by this fixed value of the reduction ratio causes a demultiplication of the distance to be traveled at the motor in order to displace the actuator from its inactive position to the position in which it holds the transmission system in the given state. To avoid an increase in the time required for displacement over this actuator travel, an electrical machine capable of rotating two to four times faster would be necessary. This problem can be solved by controlling the commutation cells so that the torque constant assumes the low value, allowing the motor to rotate two to four times faster than with the high value.

The control system can be configured to limit the current supplied to the electrical machine upon startup of the latter, in order to prevent excessive heating in the electrical machine or demagnetization of permanent magnets that can be used in the electrical machine.

This current limitation can be adjusted depending on the thermal state of the electrical machine and the magnetization characteristic of the permanent magnets; said thermal state can be determined from a temperature measurement and/or on the basis of a temperature model, as described in the document FR 2 951 033.

The static converter can comprise three arms mounted in parallel, each arm comprising two commutation cells in series separated from one another by a neutral point, each neutral point allowing electrical connection of the converter to the electrical circuit of the armature.

According to a first exemplifying embodiment of the invention, the electrical machine is a DC machine, said machine comprising three brushes, each brush being connected to one of the neutral points of the static converter. The electrical machine can comprise only two poles on the stator.

According to this first exemplifying embodiment of the invention, the brushes can be arranged so that when they interact with the collector of the DC machine,
  when the current flows between the first and the second brush in the electrical circuit of the armature, said current passes through all the turns of the electrical circuit of the armature, and
  when the current flows between the third brush and one of the first and the second brush in the electrical circuit of the armature, said current passes through only a portion of the turns of the electrical circuit of the armature.

Controlling the static converter in such a way that the current flows between the first and the second brush in the electrical circuit of the armature, or in such a way that said current flow in the electrical circuit of the armature occurs between one of the first and the second brush and the third brush, thus changes the number of turns of the electrical circuit of the armature through which said current passes.

The turns of the electrical circuit of the armature through which the electrical current passes when it flows between the first and the third brush can form, with the turns of the electrical circuit of the armature through which the electrical current passes when it flows between the second and the third brush, a partition (in the mathematical sense) of the turns of the electrical circuit of the armature through which the electrical current passes when it flows between the first and second brush.

Because the ratio between the electromagnetic torque T exerted on the DC machine and the current I flowing in the electrical circuit of the armature is $$T = n \times n_e \times (\Phi/2\pi) \times I$$

where
n is the number of turns through which the electrical current passes in the electrical circuit of the armature,
$n_e$ is the number of rotor slots, and
$\Phi$ is the magnetic flux in the air gap of the DC machine,
the value of the torque constant K is then $n \times n_e \times (\Phi/2\pi)$.

The number of turns of the electrical circuit of the armature through which said current passes is thus modified, depending on whether or not the electrical current is flowing via the third brush, so that the value of the torque constant K is modified.

The torque constant is thus higher when then the static converter is controlled so that the current flows in the electrical circuit of the armature between the first and the second brush than when current flow in the electrical circuit of the armature involves the third brush.

According to a first sub-example of this first exemplifying embodiment of the invention, the brushes are arranged in such a way that when they interact with the collector of the DC machine, the current flowing between the third and the first brush in the electrical circuit of the armature passes through a number of turns equal to that through which it passes when it flows between the third and the second brush in the electrical circuit of the armature.

According to this first sub-example, the number of turns through which the electrical current passes in the electrical circuit of the armature is thus same whenever the third brush conveys said current, whether the other brush used to convey current in the electrical circuit of the armature is the first or the second brush. In this case a first value for the torque constant is obtained when the static converter is controlled so that the current flows in the electrical circuit of the armature between the first and the second brush, and a second value for the torque constant, lower than the first, is obtained when the static converter is controlled so that the current flows in the electrical circuit of the armature between the first brush and the third brush or between the second brush and the third brush.

In this case only two possible values for the torque constant can be obtained, so that only a single high value exists which corresponds to the actuator's operating mode allowing the state of the transmission system to be maintained or allowing slow displacement of the actuator, and so that only a single low value exists for the transient operation of the actuator.

This first sub-example having only two different values for the torque constant of the electrical machine is configured for the case in which the torque that the actuator must exert in order to bring the transmission system from the coupled state to the decoupled state is substantially of the same order as the torque that the actuator must exert in order to bring the transmission system from the decoupled state to the coupled state. This is the case, for example, when the transmission system is a gearbox synchronizer.

According to a second sub-example of this first exemplifying embodiment of the invention, the brushes are arranged so that when they interact with the collector of the DC machine, the current flowing between the third and the first brush in the electrical circuit of the armature passes through a first number of turns differing from a second number of turns passed through by said current when it flows between the third and the second brush in the electrical circuit of the armature.

According to this second sub-example, the number of turns through which the electrical current passes in the electrical circuit of the armature is different when the third brush is conveying said current, depending on whether the other brush used to convey the current in the electrical circuit of the armature is the first or the second brush. For example, the number of turns through which the electrical current passes in the electrical circuit of the armature is greater when the current flows between the first and the third brush than when the current flows between the second and the third brush.

In this case a first value for the torque constant is obtained when the static converter is controlled so that the current flows in the electrical circuit of the armature between the first and the second brush; a second value for the torque constant, lower than the first, is obtained when the static converter is controlled so that the current flows in the electrical circuit of the armature between the first brush and the third brush; and a third value for the torque constant, lower than the second, is obtained when the static converter is controlled so that the current flows in the electrical circuit of the armature between the second brush and the third brush.

Three possible values for the torque constant can thus be obtained in this case, so that a single high value exists, corresponding to the operating mode of the actuator allowing the state of the transmission system to be maintained or allowing slow displacement of the actuator, and so that two low values exist for different transient modes.

For example, the third brush is positioned so that when the static converter is controlled in such a way that the current flows in the electrical circuit of the armature between the first brush and the third brush, the number of turns through which the electrical current passes is equal to two-thirds the number of turns of the electrical circuit of the armature through which the current passes when it flows between the first and the second brush. The third brush is likewise positioned so that when the static converter is controlled in such a way that the current flows in the electrical circuit between the second brush and the third brush, the number of turns through which the electrical current passes is equal to one-third the number of turns of the electrical circuit of the armature through which current passes when it flows between the first and the second brush.

The existence of three different values for the torque constant of the DC machine can be advantageous in particular when the transmission system is a single or double clutch. That is because in such a case, the consequence of friction and hysteresis phenomena is that the torque that the actuator must provide is not the same when the latter must bring the clutch into the engaged state and into the disengaged state. The possibility of achieving two different low values for the constant thus provides satisfactory dynamic behavior for the actuator in these two different modes.

In the case where the vehicle transmission system is a single clutch, the second value of the torque constant K can be used to bring the clutch into an engaged (or coupled state, while the third value of the torque constant K can be used to bring the clutch into an disengaged (or decoupled state, and the first value of the torque constant K can be used to hold in the clutch in the decoupled state.

In the case in which the vehicle transmission system is a double clutch whose inactive state (i.e., when the actuator (2) is deactivated) is the disengaged (or decoupled state, the second value of the torque constant K, i.e. the largest low value, can be used to bring the clutch into the decoupled state, while the third value of the torque constant K, i.e. the smallest low value, can be used to bring the clutch into the engaged (or coupled state, and the first value of the torque constant K can be used to hold the clutch in the coupled state.

According to this first exemplifying embodiment of the invention, the control system of the commutation cells is configured at least to allow:
the commutation cells of the static converter to be controlled so that the current flowing in the electrical circuit of the armature flows both in the first brush, and in the second brush, and in a portion of the arms to whose neutral points said brushes are connected, and
the commutation cells of the static converter to be controlled so that the current flowing in the electrical circuit of the armature flows both in the third brush, and in one of the first and the second brush, and in a portion of the arms to whose neutral points said brushes are connected.

The actuator can comprise an element for measuring the current flowing between the neutral point of an arm and the brush to which it is connected, and an element for measuring the current flowing between the neutral point of another arm and the brush to which it is connected. These current measuring elements allow closed-loop control of the commutation cells of the static converter.

According to a second exemplifying embodiment of the invention, the electrical machine is a synchronous machine and the static converter constitutes a three-phase inverter. The synchronous machine can be a permanent-magnet rotor machine or a wound-rotor machine. It can also be a brushless direct-current (BLDC) machine. Such machines are more robust and can provide greater performance than DC machines.

In such a machine, the torque constant K depends on the internal angle of the machine, which is the angle defined between the rotor flux in the machine and the flux generated by the rotating stator field. According to this second exemplifying embodiment of the invention, the control system of the commutation cells can be configured to apply vector control to the commutation cells of the three-phase inverter, said control allowing the internal angle of the machine to assume at least two different values.

Using the Clarke and Park transformations, the equation relating the electromagnetic torque exerted on the rotor of the electrical machine and the modulus of the current vector in the Park frame of reference is:

$$T=(3/2) \times P \times \Phi \times \sin \psi \times I'$$

where
P is the number of pole pairs of the stator of the synchronous machine,
$\Phi$ is the magnetic flux in the air gap of the DC machine,
$\Psi$ is the internal angle of the machine, and
I' is such that $I'=\sqrt{(I_d^2+I_q^2)}$ where $I_d$ and $I_q$ are the components on the direct axis and on the squared axis of the transform in the Park frame of reference of the current flowing in the electrical circuit of the stator.

Controlling the control system of the commutation cells in such a way as to change the internal angle iv of the synchronous machine, i.e. defluxing said synchronous machine, thus results in a change in the value of the torque constant K that is equal to $(3/2) \times P \times \Phi \times \sin \psi$.

The high value of the torque constant K is obtained, for example, when the commutation cells of the static converter are controlled so that the angle iv is equal to 90°.

It can be advantageous for the ratio between the high value of the torque constant and the low value of said constant to be equal to 3, for example, when the transmission system is a single or double clutch; or to be equal to 2, for example, when the transmission system is a gearbox. The low value of the torque constant K is obtained by controlling the commutation cells of the static converter so that the internal angle of the machine is equal to 19.3° when a ratio of 3 between the torque constant values is desired, and so that said internal angle is equal to 30° when a ratio of 2 between the torque constant values is desired.

In this instance, vector control of the commutation cells of the static converter can allow the torque constant K to assume exactly two or three, or even more, different values.

According to this second exemplifying embodiment of the invention, the actuator can comprise an apparatus for measuring the current flowing in one of the phases of the stator of the synchronous machine, and an apparatus for measuring the current flowing in another of the phases of said stator. Since the three-phase system is balanced, knowing the current in two of the phases makes it possible to determine all the stator currents. Closed-loop vector control can thereby be implemented.

The synchronous machine can be associated with three Hall effect sensors arranged at 120°.

According to the two exemplifying embodiments above of the invention, the control system can be configured so as to apply auxiliary control when it receives an information item relative to the existence of a fault. This auxiliary control can act on the commutation cells of the static converter so that the commutation cell of each arm connecting the neutral point and the positive DC input of the static converter is nonconductive, and so that the commutation cell of each arm connecting the neutral point and the negative DC input of the static converter is conductive. The electrical machine is then disconnected from the electrical energy source and is instead looped onto itself. The reliability of the actuator is thereby increased, since the latter's motor is braked if it is driven by the load, which happens in the case in which the transmission system is a single clutch that has a coupled inactive state and that is in the decoupled state when the fault occurs. Abrupt, undesired movement of the vehicle is thereby avoided and/or minimized.

For example, in the case in which the fault relates to one of the commutation cells connecting the neutral point of one arm to the positive DC input of the static converter, said commutation cell being locked in the conductive mode, the auxiliary control can then
control the other commutation cells connecting the other neutral points to the positive DC input of the converter so that they are conductive, and
control the commutation cells connecting the neutral points to the negative DC input of the static converter so that they are nonconductive,
in order to implement the braking function.

When the fault relates to a commutation cell connecting a neutral point to the negative DC input of the static converter, and when that cell is locked in the conductive mode, a control input symmetrical to the one just described can be applied.

When the fault relates to one of the commutation cells and the latter is locked in the nonconductive state, the auxiliary control can be such that control is applied to the commutation cells connected to that DC input of the static converter to which the commutation cell suffering from the fault is not connected.

As a variant, and in particular in the case in which the transmission system is a double clutch whose inactive state is the decoupled state, the auxiliary control can consist in causing all the commutation cells of the static converter to become nonconductive in order to accelerate transition of the transmission system into the decoupled state.

In all of the above, the fault can relate to the actuator, to the transmission system, more globally to the drive train of the vehicle, or even more globally to the vehicle.

In all of the above, when the electrical machine is a rotating one, the actuator can comprise an apparatus for measuring the angular position of the rotor of the rotating electrical machine.

The invention is not limited to the examples of electrical machines mentioned above. It likewise applies to actuators for transmission systems operating with the aid of an asynchronous machine, of a variable-reluctance or synchro-cogging machine, or of an self-regulated synchronous machine.

A further object of the invention, in accordance with another of its aspects, is an actuator for a vehicle transmission system, comprising
  an electrical machine,
  a static converter comprising a plurality of commutation cells, the static converter being disposed so as to electrically connect the electrical circuit of the armature to an electrical energy source, and
  a system for controlling the commutation cells of the static converter, said system being configured to allow defluxing of the electrical machine so that the torque constant of said electrical machine can assume at least two different values.

All or some of the characteristics mentioned above are applicable to this other aspect of the invention.

A further object of the invention, in accordance with another of its aspects, is an assemblage comprising:
  an actuator as defined above, and
  a vehicle transmission system, said system comprising an apparatus capable of being displaced by the actuator.

The actuator can comprise an actuation element configured to displace said apparatus of the transmission system.

The apparatus capable of being displaced by the actuator can be a clutch diaphragm or a master cylinder, for example.

The transmission system can be a dry clutch, a double dry clutch, and a gearbox synchronizer.

A further object of the invention, in accordance with another of its aspects, is a method for controlling an actuator as defined above, in which method control of the commutation cells of the static converter allows the value of the torque constant to assume at least one high value and at least one low value.

The method can comprise the step according to which the commutation cells are controlled so that the torque constant assumes the high value when the actuator is holding the transmission system in a given state.

This given state can be the coupled state or the decoupled state of the transmission system. The fact that the transmission system is being held in this state by the actuator is expressed, in terms of the actuator, by the fact that the latter's position setpoint does not develop further, and that displacement thereof is terminated.

When the transmission system is a single or double clutch whose inactive state is the coupled state, the commutation cells can be controlled so that the torque constant assumes the high value, in order for the actuator to hold the transmission system in the decoupled state.

When the transmission system is a single or double clutch whose inactive state is the decoupled state, the commutation cells can be controlled so that the torque constant assumes the high value in order for the actuator to hold the transmission system in the coupled state.

The method can comprise the step according to which the commutation cells are controlled so that the torque constant assumes the low value in order to displace the actuator. This step can be performed upon receipt of a displacement setpoint, and can allow the state of the transmission system to be modified.

As mentioned previously, the control system can be configured so that the torque constant can assume only one high value and at least two, in particular only two, low values. The transmission system can be a clutch, and the commutation cells can be controlled so that the torque constant assumes one of the low values in order to bring the transmission system into the decoupled state, and the commutation cells can be controlled so that the torque constant assumes the other of the low values in order to bring the transmission system into the coupled state.

In the case in which the transmission system is a single clutch whose inactive state is the coupled state, the larger low value of the torque constant can be used to bring the clutch into the coupled state, while the smaller low value of the torque constant can be used to bring the clutch into the decoupled state.

In the case in which the transmission system is a double clutch, the larger low value of the torque constant can be used to bring the clutch into the decoupled state, while the smaller low value of the torque constant can be used to bring the clutch into the coupled state.

As mentioned previously, the control system can be configured so that the torque constant can assume only one high value and only one low value. This is the case, for example, when the transmission system is a gearbox synchronizer, in which case application of control to the commutation cells in such a way that the torque constant assumes the high value can correspond to the synchronization phase of said synchronizer. This phase can consist in synchronizing the upstream and downstream speeds of said synchronizer.

Again when the transmission system is a gearbox synchronizer, application of control to the commutation cells in such a way that the torque constant assumes the low value can correspond to the displacement phases, outside the synchronization phase, of said synchronizer.

According to the above method, the control system can be configured so as to apply auxiliary control to the commutation cells when said control system receives an information item relating to the existence of a fault.

The transmission system is, for example, a single or double clutch whose inactive state is the coupled state; the auxiliary control can act on the commutation cells of the static converter in such a way that:
  the commutation cell of each arm connecting the neutral point and the respectively positive and negative DC input of the static converter is nonconductive, and
  the commutation cell of each arm connecting the neutral point and the respectively negative and positive DC input of the static converter is conductive, in order to brake the electrical machine when it is driven by the load of the transmission system.

As a variant, the transmission system is a single or double clutch whose inactive state is the decoupled state, and the auxiliary control acts on the commutation cells of the static converter so as to make all said commutation cells of the static converter nonconductive, in order not to brake the electrical machine when it is driven by the load of the transmission system.

BRIEF DESCRIPTION OF THE DRAWINGS

The invention can be better understood by reading non-limiting exemplifying embodiments thereof and by examining the attached drawings, in which.

DETAILED DESCRIPTION OF THE PREFERRED EMBODIMENT(S)

Figure 1:
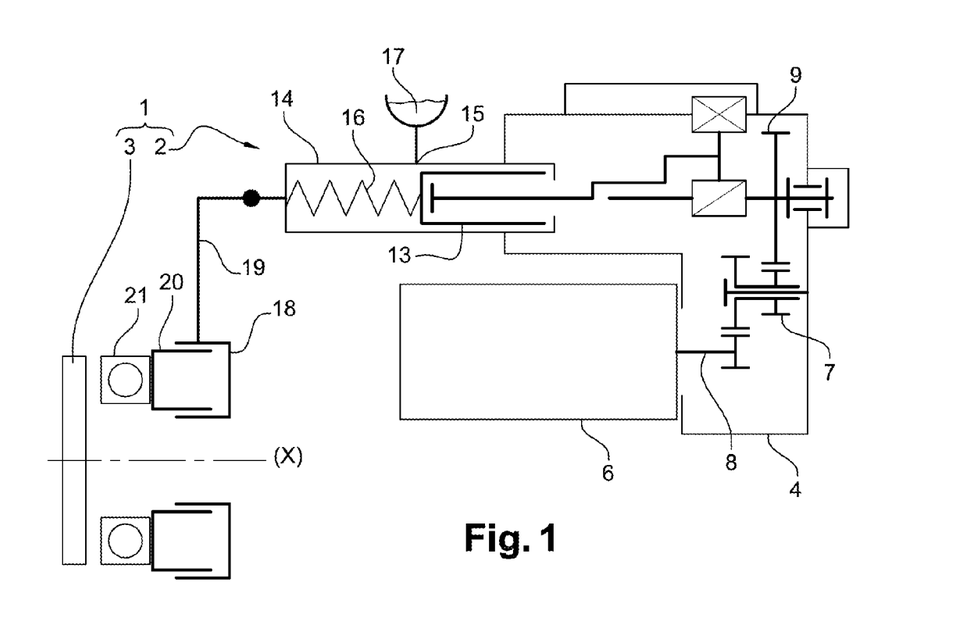
FIG. 1 is a kinematic depiction of an assemblage comprising an actuator according to an exemplifying embodiment of the invention, and the transmission system with which it interacts.
Figure 2:
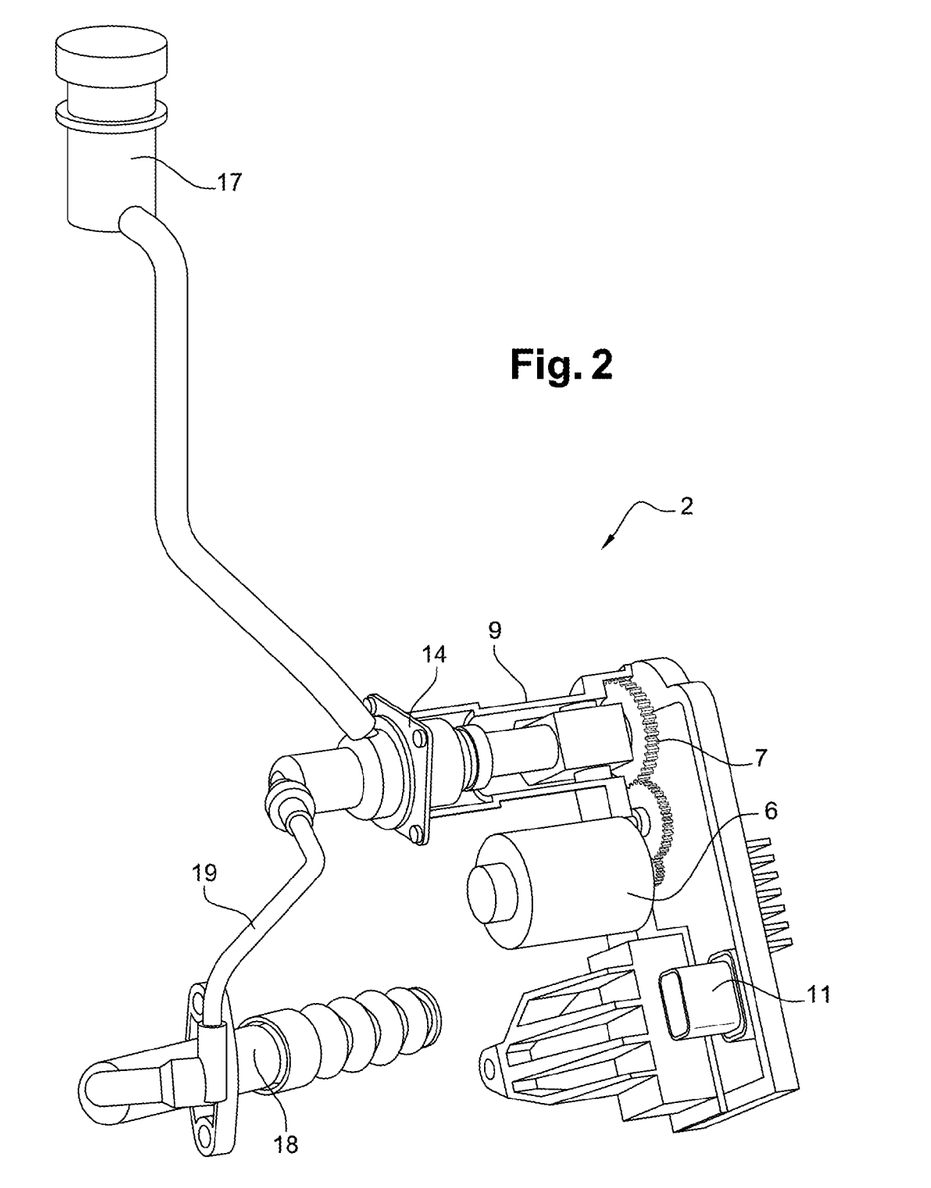
FIG. 2 is an elevation view of the assemblage of FIG. 1.

FIG. 1 depicts an assemblage 1 comprising an actuator 2 interacting with a transmission system 3. In the example of FIG. 1, transmission system 3 is a single clutch.

In this example, actuator 2 comprises a housing 4 coacting with the crankcase of an electrical machine 6. The housing can be mounted on the engine/propulsion assembly, or on the chassis, of a vehicle.

Housing 4 can receive a reduction gearbox 7 rotationally driven by output shaft 8 of electrical machine 6, and a rotary/linear motion transformation system 9. Reduction gearbox 7 here has a fixed transmission ratio. Reduction gearbox 7 can comprise one or two reduction stages. In the example considered, the value of the reduction gearbox transmission ratio is determined as a function of the maximum power output applied by transmission system 3 to actuator 2, in order to reduce the electromagnetic torque that must be applied to the rotor of electrical machine 6 when it holds transmission system 3 in a given state.

In the example considered, housing 4 also contains a circuit board 10 allowing the operation of electrical machine 6 to be controlled so that actuator 2 can exhibit at least two different operating modes. As will become apparent below, this control consists in modifying the torque constant of electrical machine 6 so that it can assume at least two different values.

A connector 11 is also carried by housing 4 in order to allow circuit board 10 to be electrically connected to an electrical energy source which is, for example, the battery of the onboard electrical system. Connector 11 can also allow circuit board 10 to be connected to the vehicle's controller area network (CAN) bus. This therefore allows electrical machine 6 to be controlled by the vehicle's engine control unit (ECU), which implements in particular a software program for monitoring transmission system 3.

The housing can also receive a sensor 12 for sensing the position of a movable element of actuator 2, for example a sensor for sensing the position of the rotor of electrical machine 6. This sensor 12 can be carried, or not, by circuit board 10. The processing portion of said sensor is carried, for example, by board 10, while the measurement portion of said sensor 12 is located at the rotor of electrical machine 6.

The rotary/linear motion transformation system 9 is, for example, a ball screw, a leadscrew, or a planetary roller screw. The rotary/linear motion transformation system 9 can thus be as described in the application filed by the Applicant on Oct. 2, 2013 in France under number 13 59544, the content of which is incorporated by reference into the present application. The rotary/linear motion transformation system 9 makes it possible, proceeding from the rotary motion transmitted by reduction gearbox 7, to translationally (i.e., linearly) displace a piston 13 of a master cylinder 14 so that the state of the clutch 3 can be modified (i.e., to selectively engage or disengage the clutch 3).

Displacement of said piston 13 over a first travel distance, called the "dead travel," uncovers an orifice 15 that connects chamber 16 of master cylinder 14 to a low-pressure hydraulic reservoir 17. Displacement of piston 13 over a second travel distance, called the "active travel," causes said orifice to be covered again, so that the fluid contained in chamber 16 of master cylinder 14 can be displaced by piston 13 toward a slave cylinder 18 via a hydraulic conduit 19. In the example considered, slave cylinder 18 comprises an annular piston 20 coaxial with rotation axis X of clutch 3. In the example considered, said annular piston 20 is connected to a ball bearing 21 that causes the diaphragm of clutch 3 to be displaced, for example via a fork, translationally along axis X.

Figure 3:
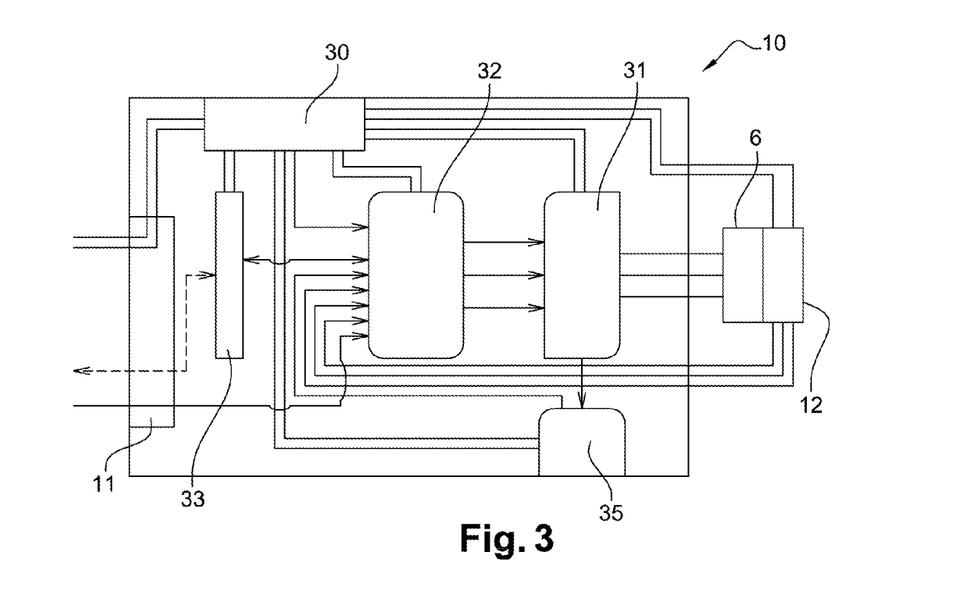
FIG. 3 depicts an example of a circuit board used in order to implement an actuator according to an exemplifying embodiment of the invention.

FIG. 3 depicts circuit board 10 in functional terms. As depicted in FIG. 3, circuit board 10 encompasses means for controlling electrical machine 6 and, in the example considered, it coacts with sensor 12 that is external to board 10.

Board 10 is connected to connector 11 that, as already mentioned, allows power signals and control signals to be conveyed simultaneously to the board.

In the example considered, board 10 comprises a module 30 for managing the electricity supplied to board 10. This module 30 is supplied with electricity via connector 11 by an electrical energy source of the vehicle, for example the battery of the onboard electrical system. As depicted, module 30 is configured to generate power signals allowing the various components of board 10, as well as sensor 12 for sensing the position of the rotor of electrical machine 6, to be supplied with electricity.

Board 10 can also, as depicted in FIG. 3, comprise a static converter 31, a system 32 for controlling static converter 31, a module 33 for managing communication on the CAN bus, and a sensor 35 for sensing the current in electrical machine 6. Module 30 can generate power signals of differing values for these various components 31 to 35.

In the example considered, static converter 31 comprises three arms 40 mounted in parallel, each arm 40 being mounted between a positive DC input 47 and a negative DC input 48 of static converter 31. Each arm 40 comprises two commutation cells 41 in series separated from one another by a neutral point 42, each neutral point 42 allowing electrical connection of converter 31 to the electrical circuit of the armature of electrical machine 6 via a branch 44. Each commutation cell can constitute a bidirectional current switch, constituted e.g. by a field effect transistor.

Static converter 31 is configured to supply electricity to the armature of the electrical machine based on the electricity provided by electrical power management module 30 of board 10.

System 32 for controlling static converter 31 comprises, for example, one or several microcontroller(s). This or these microcontroller(s) is/are configured to communicate with other elements of circuit board 10. They are configured, for example, to receive and process data arriving from sensor 12 for sensing the position of the rotor of electrical machine 6. These data are transmitted, for example, in analog form or in the form of duty cycle values. Processing of these data by control system 32 can allow implementation of closed-loop control of actuator 2, for example in terms of current and/or position and/or power output.

Control system 32 can furthermore receive and process data from current sensor 35 in electrical machine 6, and from other possible sensors carried by board 10, in particular sensors performing measurements of temperature and of supply voltage. Control system 32 can also receive and process data arriving from sensors external to the board, whose measurements are conveyed to control system 32 via connector 11 and management module 33.

Control system 32 can likewise receive and process, via connector 11 and management module 33, other information items relating to the control of actuator 2, which e.g. come from the ECU and are then decoded by said control system 32.

In the case in which actuator 2 interacts with a clutch, the measurements thus conveyed via connector 11 can comprise measurements of the input speed of a gearbox of the vehicle. In the case in which actuator 2 is a transition actuator or a gear ratio selection actuator, the measurements conveyed via connector 11 can comprise secondary range oil temperature measurements or measurements of the position of a gear ratio transition lever.

Control system 32 can likewise send data via management module 33 and connector 11 out from circuit board 10.

In order to effect the various aforesaid communications, control system 32 of static converter 31 can have analog inputs, logic inputs, analog outputs, and outputs that manage the logic signals or duty cycle values for controlling commutation cells 41 of static converter 31.

Management module 33 comprises electronic elements configured to manage communication on a multiplexed network bus and to transmit data transported by the link to control system 32.

An actuator 2 according to a first exemplifying embodiment of the invention will now be described in more detail with reference to FIGS. 4 to 7.

According to this first exemplifying embodiment of the invention, the electrical machine is a DC motor comprising two stator poles, each of said poles being constituted by a permanent magnet. The electrical circuit of the armature, which here is the rotor, is connected via a collector 50 and brushes 51 and 52 to neutral point 42 of each arm 40. More precisely, each brush 51 or 52 allows an arm 40 to be connected via a branch 44 to a neutral point 42. Further in accordance with this first exemplifying embodiment of the invention, static converter 31 is a DC/DC voltage converter.

Figure 4A:
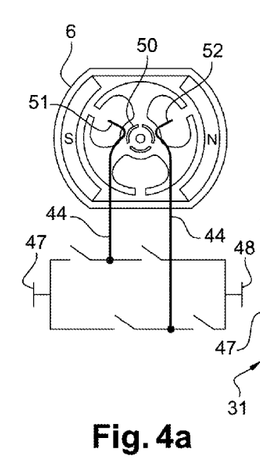
FIG. 4a depicts a static converter allowing a DC machine to be supplied with electricity, and said DC machine according to the existing art.

In the example of FIG. 4 only two brushes 51 and 52 are provided, and the current flowing in the electrical circuit of the rotor between these two brushes passes through all the turns of said electrical circuit of the rotor. For a machine of this kind, a proportional relationship exists between the electromagnetic torque T applied to the rotor of the machine and the current I passing through the electrical circuit of the rotor, the proportionality coefficient K being called the "torque constant." The equation is $$T = n \times n_e \times (\Phi/2\pi) \times I$$

where n is the number of turns through which the electrical current passes in the electrical circuit of the armature, $n_e$ is the number of rotor slots, and $\Phi$ is the magnetic flux in the air gap of the DC machine.

The value of the torque constant K is then $n \times n_e \times (\Phi/2\pi)$.

In the case in which electrical machine 6 and static converter 31 are as depicted in FIG. 4a, the value of K is constant, so that there is a single curve 100 (visible in FIG. 4b) depicting the speed of the machine as a function of the mechanical torque exerted by transmission system 3 on electrical machine 6, and a single curve 101 (visible in the same Figure) depicting the current passing through the electrical circuit of the rotor as a function of the torque T. It is apparent in particular that an actuator 2 having this type of converter 31 and electrical machine 6 can produce a relatively low current I necessary for holding actuator 2 in position, but that the displacement speed of such an actuator is not satisfactory.

To eliminate this disadvantage, according to the first exemplifying embodiment the invention proposes to add a third brush 53 and a third arm 40 to static converter 31. The latter is then embodied in the form of three H-shaped half-bridges. The addition of a third brush 53 allows the number of turns of the electrical circuit of the rotor through which the electrical current I passes between two neutral points 42 of static converter 31 to be varied.

First brush 51 and second brush 52 are arranged here in the same manner as the two brushes described with reference to FIGS. 4a and 4b, i.e. when current I flows between first brush 51 and second brush 52 in the electrical circuit of the rotor, said current passes through all the turns of said electrical circuit.

Third brush 53 is arranged so that when the current I flows between third brush 53 and one of first 51 and second brush 52 in the electrical circuit of the rotor, said current passes through only a portion of the turns of the electrical circuit of the rotor. Depending on a control signal applied by control system 32 to commutation cells 41 of static converter 31, the current being supplied to the electrical winding of the rotor is thus conveyed by third brush 53, so that the torque constant K of electrical machine 6 can be modified by modifying the number of turns in the electrical circuit of the rotor through which said current passes. The torque constant K is then higher when static converter 31 is controlled so that current flows in the electrical circuit of the rotor between first brush 51 and second brush 52 than when the flow of current in the electrical circuit of the rotor involves third brush 53.

Figure 5A:
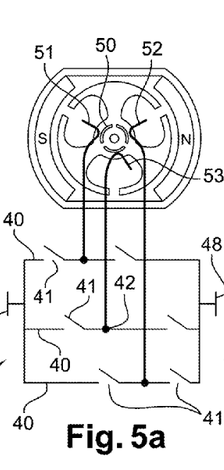
FIG. 5a depicts a static converter allowing a DC machine to be supplied with electricity, and said machine of an actuator according to a first sub-example of a first exemplifying embodiment of the invention.

A first sub-example of this first exemplifying embodiment of the invention will be described with reference to FIGS. 5a and 5b. According to this first sub-examples, third brush 53 is arranged so that when it interacts with collector 50 of DC machine 6, the current I flowing between third brush 53 and first brush 51 in the electrical circuit of the rotor passes through a number of turns equal to the number it passes through when it flows between third brush 53 and second brush 52 in the electrical circuit of the rotor. The number of turns through which the current passes when third brush 53 is conveying said current is in this instance equal to half the total number of turns in the electrical circuit of the rotor through which the current I passes between first brush 51 and second brush 52.

Figure 4B:
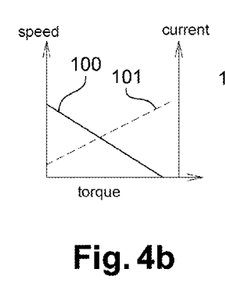
FIG. 4b is a graph depicting the speed of the machine and the current supplied to the latter as a function of the electromagnetic torque applied to the machine.
Figure 5B:
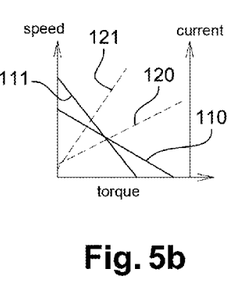
FIG. 5b is a graph depicting the speed of the machine and the current supplied to the latter as a function of the electromagnetic torque applied to the machine.

As is evident from FIG. 5b, there are two curves 110 and 111 visible in FIG. 4b depicting the speed of the machine as a function of the torque T, and two curves 120 and 121 visible in the same Figure and depicting the current passing through the electrical circuit of the rotor as a function of the torque T. Curves 110 and 120, which correspond to control of static converter 31 in such a way that the electrical current passing through the electrical circuit of the rotor flows between first brush 51 and second brush 52, are respectively identical to curves 100 and 101 of FIG. 4b. These curves correspond to control of the electrical machine in such a way that actuator 2 is in an operating mode in which it maintains the state of transmission system 3, or in which it is being displaced slowly.

Curves 111 and 121 express the existence in this case of a second torque constant value that is lower than the high value of the torque constant in the case of FIG. 4. When static converter 31 is controlled so that this lower torque constant value is obtained, it is evident that the displacement of actuator 2 is faster, although the current required to hold actuator 2 is position is higher. Curves 111 and 121 correspond to a transient operating mode of actuator 2.

Figure 6A:
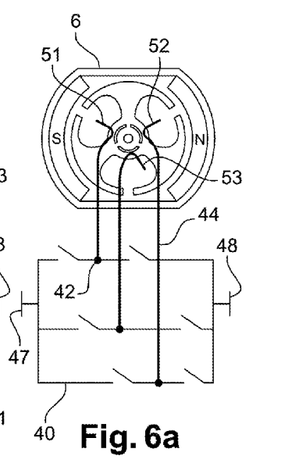
FIG. 6a depicts a static converter allowing a DC machine to be supplied with electricity, and said machine of an actuator according to a second sub-example of the first exemplifying embodiment of the invention.

A second sub-example of the first exemplifying embodiment of the invention will now be described with reference to FIGS. 6a and 6b. According to this second sub-example, third brush 53 is arranged so that the current I flowing between third brush 53 and first brush 51 in the electrical circuit of the rotor passes through a first number $n_1$ of turns that is different from a second number $n_2$ of turns through which it passes when it flows between third brush 53 and second brush 52 in said electrical circuit.

The first number $n_1$ of turns is, for example, larger than the number $n_2$ of turns. The first number $n_1$ is equal, for example, to two-thirds the total number of turns of the electrical winding of the rotor through which current passes between first brush 51 and second brush 52, while the second number $n_2$ is equal to one-third of said total number of turns. Corresponding respectively to the values $n_1$ and $n_2$ are two low values of the torque constant K, one being smaller than the other.

According to this second sub-example, what is obtained is:

a high value of the torque constant K when static converter 31 is controlled so that the current I flows in the electrical circuit of the rotor between first brush 51 and second brush 52;

a first low value of the torque constant K when static converter 31 is controlled so that the current I flows in the electrical circuit of the rotor between first brush 51 and third brush 53; and a second low value of the torque constant K, smaller than the first low value, when static converter 31 is controlled so that the current I flows in the electrical circuit of the rotor between second brush 52 and third brush 53.

In this case it is thus possible to obtain three possible values for the torque constant.

Figure 6B:
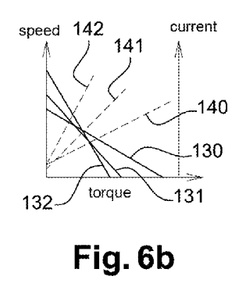
FIG. 6b is a graph depicting the speed of the machine and the current supplied to the latter as a function of the electromagnetic torque applied to the machine.

As is evident from FIG. 6b, three are three curves 130, 131, and 132 depicting the speed of the machine as a function of the torque T, and three curves 140, 141, and 142 depicting the current flowing through the electrical circuit of the rotor as a function of the torque T. Curves 130 and 140, which correspond to control of static converter 31 in such a way that the electrical current passing through the electrical circuit of the rotor flows between first brush 51 and second brush 52, are respectively identical to curves 100 and 101 of FIG. 4b. These curves correspond to control of the electrical machine in such a way that actuator 2 is in an operating mode in which it maintains the state of transmission system 3 or in which it is displaced slowly.

Curves 131 and 141 express the existence in this case of a first low torque constant value, while curves 132 and 142 express the existence of a second low torque constant value. These two curve pairs correspond to configurations in which actuator 2 is being displaced quickly, in transient manner.

The presence of two low values for the torque constant K allows satisfactory management of the case in which the displacement direction of actuator 2 imposes particular constraints on the torque that the latter can exert on transmission system 3. Each low value of the torque constant K can then be dedicated to one displacement direction of actuator 2.

Figure 7:
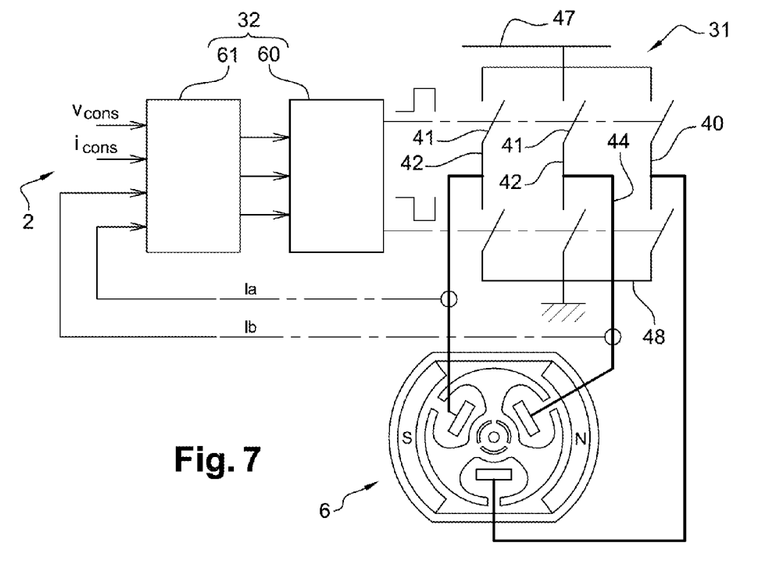
FIG. 7 supplements FIG. 5a or FIG. 6a by adding thereto a control system of the static converter.

FIG. 7 depicts control system 32, static converter 31, and the DC machine of the example of FIG. 5 or the example of FIG. 6. Control system 32 in this case comprises a control circuit 60 generating, for certain commutation cells 41, a voltage level to be applied to said cell in order to modify the current path in the electrical circuit of the rotor. Said control circuit 60 receives duty cycle values, identification of the commutation cells 41 to be controlled, and optionally the desired direction for displacement of actuator 2, as inputs. Based on these inputs, control circuit 60 determines the voltage levels to be applied to the relevant commutation cells 41.

Depending on the setpoints generated, a quadruplet of commutation cells 41, i.e. commutation cells 41 of two of arms 40, is controlled so as to yield the desired operating mode of actuator 2. If what is desired, for example, is for actuator 2 to be displaced, control will then be applied to commutation cells 41 surrounding neutral point 42 connected to third brush 53 and to the commutation cells surrounding one of neutral point 42 connected to first brush 51 and neutral point 42 surrounding second brush 42.

In the example considered, control system 32 also comprises a current controller 61 receiving as inputs:
- a speed setpoint for actuator 2,
- a setpoint for the current in the electrical circuit of the rotor, and
- the current values in at least two branches 44, measured with the aid of sensor 35 already mentioned.

Based on these inputs, current control 61 generates setpoints for control circuit 60.

A second exemplifying embodiment of the invention will now be described with reference to FIG. 8. According to this second example, electrical machine 6 is a synchronous machine that in this case has a permanent-magnet rotor. Static converter 31 here is a three-phase inverter, each arm 40 being associated with control of one phase of the electrical circuit of the armature, which here is the stator.

Control system 32 is configured to apply vector control to static converter 31. The Clarke and Park transformations, known to one skilled in the art, are used for this.

The equation relating the electromagnetic torque exerted on the rotor of the electrical machine and the modulus of the current vector in the Park frame of reference is:

$$T=(3/2)\times P\times\Phi\times\sin\psi\times I'$$

where
P is the number of pole pairs of the stator of the synchronous machine,
$\Phi$ is the magnetic flux in the air gap of the machine,
$\Psi$ is the internal angle of the machine i.e. the angle defined between the rotor flux in the machine and the flux generated by the rotating stator field, and
I' is such that $I'=\sqrt{(I_d^2+I_q^2)}$ where $I_d$ and $I_q$ are the components on the direct axis and on the squared axis of the transform in the Park frame of reference of the current flowing in the electrical circuit of the stator.

Figure 8:
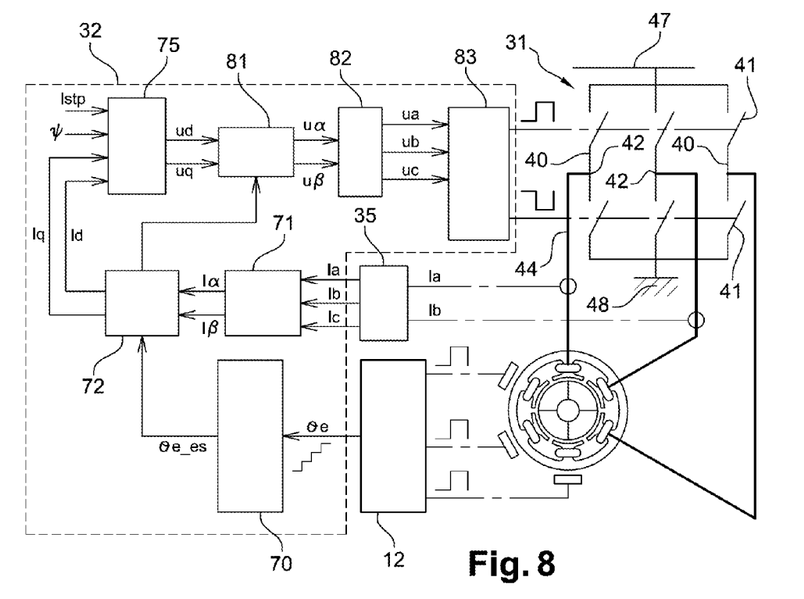
FIG. 8 depicts a control system, a static converter, and a synchronous machine of an actuator according to a second exemplifying embodiment of the invention.

As is apparent from FIG. 8, control system 32 interacts here with position sensor 12, which in the example considered is a Hall effect sensor, and with current sensor 35 with which the value of the current in two of the phases of the electrical circuit of the stator can be determined. Since the three-phase system is balanced in this case, the value of the current in the last phase of the electrical circuit of the stator can be deduced, so that the value of current in each phase of the stator is known.

In this example, control system 32 is configured to receive and process the data arriving from said sensors 12 and 35. Control system 32 comprises an unknown input observer 70 that receives the values transmitted by the Hall effect sensor. The output of this observer 70 is a precise measurement of the electrical angle of the rotor.

The Clarke transformation is applied via a block 71 to the current in each phase of electrical machine 6, then the outputs of said block 72 are received as input by a block 73 that, with the aid of the value of the electrical angle of the rotor provided by observer 70, applies the Park transformation to said outputs. The components in the Park frame of reference of the current I flowing in the electrical winding of the stator are then received as input by a current controller 75 that also receives as input a setpoint value for the internal angle $\Psi$ of the machine and a setpoint value $I_{sp}$ for the current in the electrical circuit of the stator, conveyed e.g. via the CAN connection.

Based on a comparison between the setpoint values and the values derived from the measurements made by sensors 12 and 35, current controller 75 determines the components $U_d$ and $U_q$, in the Park frame of reference, of the control voltage of electrical machine 6.

The control voltage thereby determined by said current controller is intended to cause a change in the internal angle $\Psi$ of the machine. Given that in this example the torque constant K is equal to $(3/2)\times P\times\Phi\times\sin\psi$, modifying the value of said internal angle, i.e. defluxing synchronous machine 6, causes the value of the torque constant of machine 6 to change, and it is thus possible to select the value for said constant which is best adapted to the desired operating mode of actuator 2.

For example, electrical machine 6 can be defluxed or not depending on whether it is desired for actuator 2 to be:
- in an operating mode in which actuator 2 is being displaced quickly, or
- in an operating mode in which actuator 2 is being displaced slowly, or in which it holds transmission system 3 in a given state.

For example, inverter 31 is controlled in such a way that the internal angle $\Psi$ has a value of 90° when an actuator hold or slow displacement is desired, and inverter 31 is controlled so as to reduce the value of said internal angle when what is desired is fast displacement of actuator 2.

An internal angle $\Psi$ equal to 90° corresponds to a high value of the torque constant K, while when the internal angle $\Psi$ is less than 90°, for example equal to 30°, the torque constant K has a low value. In this instance defluxing of electrical machine 6 can allow several different low values to be obtained.

Two blocks 81 and 82 then successively apply the inverse Park and Clarke transformations to this control voltage in order to produce control voltages for each phase of electrical machine 6. Based on these voltages, a control circuit 83 generates duty cycle values to be applied to the commutation cells of inverter 31 in order to apply said control voltages to each phase of the electrical machine.

Control system 32 of the exemplifying embodiments of the invention described above can be configured so as to apply an auxiliary control when a fault occurs. Said fault can be internal to actuator 2, or can affect transmission system 3, or more globally can affect an element of the vehicle's drive train or more globally can affect an element of the vehicle.

When transmission system 3 is a single clutch, this auxiliary control consists, for example, in acting on the commutation cells of static converter 31 in such a way that commutation cell 41 of each arm 40 connecting neutral point 42 and positive DC input 47 of converter 31 is nonconductive, and so that commutation cell 41 of said arm 40 connecting neutral point 42 and negative DC input 48 is conductive. The electrical machine is then disconnected from the electrical energy source.

When transmission system 3 is a double clutch, the auxiliary control consists, for example, in causing all the commutation cells 41 of static converter 31 to be made nonconductive.

Figure 9:
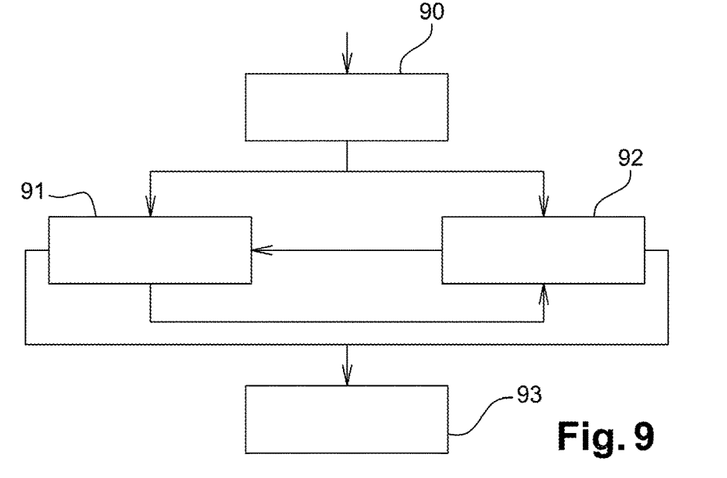
FIG. 9 is a block diagram depicting a method for controlling the actuator according to the two exemplifying embodiments described above.

FIG. 9 depicts an example of a method for controlling actuator 2 described previously. The method can comprise a step 90 of initializing actuator 2. This step can allow determination of the initial electrical angle of the rotor of electrical machine 6. When electrical machine 6 is a synchronous machine, this step can consist in applying an arbitrary voltage to the stator of machine 6 in order to orient the rotor in a preferred direction and zero the observer 70.

Upon receipt of a setpoint via the CAN bus, actuator 2 either is controlled, in accordance with a step 91, in such a way that the torque constant K assumes a high value, so that the actuator is in an operating mode in which it maintains the state of transmission system 3 or is subjected to a slow displacement, or is controlled, in accordance with a step 92, in such a way that the torque constant K assumes a low value, so that the actuator is in an operating mode in which it is subjected to a fast displacement.

Upon a further step 93 the actuator can be deactivated, electrical power then being interrupted.

Figure 10:
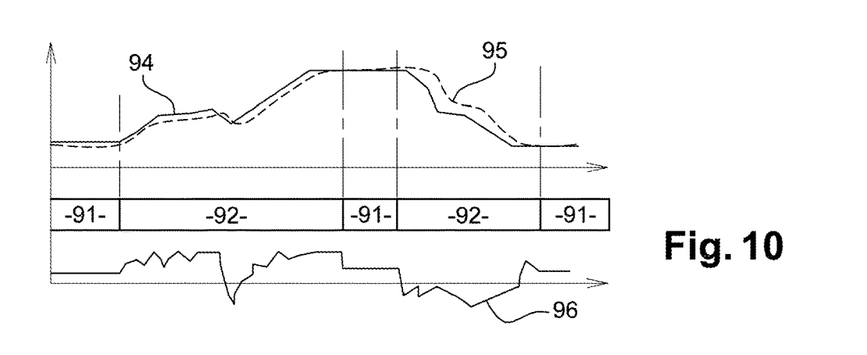
FIG. 10 simultaneously displays the position of the actuator and the electricity supplied to the electrical machine of said actuator.

FIG. 10 on the one hand depicts on a curve 94 the setpoint value for the position of actuator 92 as determined e.g. by the engine control unit of the vehicle, and depicts on a curve 95 the effective position of said actuator 2.

Depicted opposite these positions are the actuation operating mode, which in the example considered corresponds to an alternation of steps 91 and 92 described with reference to FIG. 9 and, on a curve 96, the electrical current supplied to the electrical circuit of the armature of actuator 2.

As is evident, the fact that the torque constant K has a high value during steps 91 allows a reduced current consumption, while the fact that said torque constant K has at least a low value during steps 92 allows fast displacement of actuator 2 in order to respond satisfactorily to setpoints.

Figure 11:
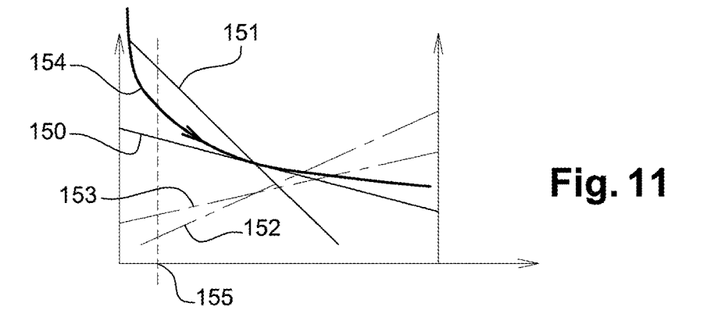
FIG. 11 is a graph depicting a number of variables, illustrating the effect of the first and second exemplifying embodiments of the invention.

FIG. 11 depicts:

the number of revolutions of electrical machine 6 performed upon application of a graduated current setpoint for a specified time span, said specified time span corresponding to the actuation time span desired for a given displacement of the output of actuator 2, and to an average torque exerted by the load of transmission system 3 on machine 6, as indicated by curves 150 and 151, the current passing through the electrical circuit of the rotor as a function of said average torque, as indicated by curves 152 and 153, and the load on actuator 2 as a function of said torque, as indicated by curve 154 which depicts an average constant displacement energy such that the product of the displacement travel (plotted on the ordinate), times the torque exerted on electrical machine 6, is constant.

The respective curves 150 and 152, and 151 and 153, correspond to the case in which the torque constant K has respectively a high value and a low value. The fixed reduction ratio is depicted by the straight line 155.

The intersection point between curves 155 and 154 corresponds to the minimum displacement to be achieved with reduction gearbox 7, the reduction ratio value of which has been defined as mentioned earlier.

The intersection point between curve 152 and line 155 defines the current being supplied to the electrical circuit of the armature when the torque constant K is at the high level, while the intersection between curve 151 and line 155 allows definition of the number of revolutions of electrical machine 6 when the torque constant K is at the low level, said number of revolutions being performed during a time span corresponding to the desired displacement time over the output travel of actuator 2.

As is evident, the doublet constituted by curves 150 and 152 does not allow actuator 2 to comply with the stipulated setpoint, but does allow consumption of only a reduced current. Control application by system 32 so as to produce this value for the torque constant is thus particularly well suited for an operating mode of actuator 2 corresponding to holding transmission system 3 in a given state, or slow displacement of actuator 2.

As is also evident, the doublet constituted by curves 151 and 153 allows actuator 2 to comply with the stipulated setpoint, but requires considerable current consumption by electrical machine 6. Control application by system 32 so as to produce this value for the torque constant is thus particularly well suited for a transient operating mode of actuator 2 corresponding to fast displacement of actuator 2.

Actuator 2 thus exhibits two different operating modes even though the ratio of reduction gearbox 7 has a fixed value.

The invention is not limited to the examples that have just been described.

In particular, although the examples described have mentioned only rotating electrical machines, the invention is also applicable to an actuator comprising a linear electrical machine.

The actuator and the transmission system according to the invention can constitute an assemblage intended to be interposed between a heat engine for vehicle propulsion and the vehicle's gearbox.

As a variant, this assemblage is intended to be interposed between a heat engine for vehicle propulsion and a gearbox associated with a rotating electrical machine.

As a further variant, two assemblages each comprising the actuator according to the invention and the transmission system can be used, one of the assemblages being arranged, for example, on the heat-engine side and the other assemblage being arranged on the gearbox side. The two assemblages can be associated with an electric propulsion motor, for example a rotating electrical machine. The transmission system on the heat-engine side then allows the crankshaft of the heat engine to be rotationally coupled to and decoupled from the rotor of the rotating electrical machine. The transmission system on the gearbox side then allows the rotor of the rotating electrical machine to be coupled to or decoupled from an input shaft of the gearbox.

The effect achieved by the invention can be demonstrated, for example, by comparing, on a bench, the following variables in two different operating modes of the actuator, one of said modes corresponding to emergency disengagement or anti-locking:

output position of the actuator, electrical current being supplied to the electric motor, torque exerted by the load of the transmission system on the electrical machine of actuator 3.

The invention claimed is:

1. An actuator (2) for actuating a vehicle transmission system (3), the vehicle transmission system (3) including a clutch, the actuator (2) comprising:

an electrical machine (6) comprising an armature and an inductor, a ratio between a variable representing an electromagnetic torque (T) exerted on the electrical machine (6) and a variable representing a current (I) flowing in an electrical circuit of the armature defining a torque constant (K) of the electrical machine (6);

a motion transformation system (9) driven by the electrical machine (6) and configured to actuate the clutch;

a static converter (31) comprising a plurality of commutation cells (41), the static converter (31) configured to electrically connect the electrical circuit of the armature to an electrical energy source; and a control system (32) for controlling the commutation cells (41) of the static converter (31), the control system configured so that the torque constant (K) of the electrical machine (6) is assigned at least two different values depending on a control signal applied to the commutation cells (41).

2. The actuator according to claim 1, further comprising a reduction gearbox (7) having a fixed reduction ratio, wherein the reduction gearbox (7) drivingly couples the electrical machine (6) to the motion transformation system (9).

3. The actuator according to claim 1, wherein the static converter (31) comprises three arms (40) mounted in parallel, wherein each arm (40) comprises two commutation cells (41) in series separated from one another by a neutral point (42), and wherein each neutral point (42) allows electrical connection of the static converter (31) to the electrical circuit of the armature.

4. The actuator according to claim 3, wherein the electrical machine (6) is a DC machine comprising three brushes (51, 52, 53), and wherein each brush is connected to one of the neutral points (42) of the static converter (31).

5. The actuator according to claim 4, wherein the brushes (51, 52, 53) are arranged so that when they interact with a collector (50) of the DC machine (6),
   when the current (I) flows between a first brush (51) and a second brush (52) in the electrical circuit of the armature, the current passes through all the turns of the electrical circuit of the armature, and
   when the current (I) flows between a third brush (53) and one of the first (51) and the second brush (52) in the electrical circuit of the armature, the current passes through only a portion of the turns of the electrical circuit of the armature.

6. The actuator according to claim 5, wherein the brushes (51, 52, 53) are arranged in such a way that when they interact with the collector (50) of the DC machine (6), the current (I) flowing between the third brush (53) and the first brush (51) in the electrical circuit of the armature passes through a number of turns equal to that through which the current (I) passes when the current (I) flows between the third brush (53) and the second brush (52) in the electrical circuit of the armature.

7. The actuator according to claim 5, wherein the brushes (51, 52, 53) are arranged so that when they interact with the collector (50) of the DC machine (6), the current (I) flowing between the third brush (53) and the first brush (51) in the electrical circuit of the armature passes through a first number ($n_1$) of turns differing from a second number ($n_2$) of turns passed through by the current (I) when the current (I) flows between the third brush (53) and the second brush (52) in the electrical circuit of the armature.

8. The actuator according to claim 4, wherein the control system (32) of the commutation cells (41) is configured at least to allow:
   the commutation cells (41) to be controlled so that the current (I) flowing in the electrical circuit of the armature flows both in the first brush (51) and in the second brush (52), and in a portion of the arms (40) to whose neutral points (42) the brushes (51, 52) are connected, and
   the commutation cells (41) to be controlled so that the current (I) flowing in the electrical circuit of the armature flows both in the third brush (53) and in one of the first brush (51) and the second brush (52), and in a portion of the arms (40) to whose neutral points (42) the brushes (51, 52, 53) are connected.

9. The actuator according to claim 3, wherein the electrical machine (6) is a synchronous machine and the static converter (31) includes a three-phase inverter.

10. The actuator according to claim 9, wherein the control system (32) is configured to apply a vector control to the commutation cells (41) of the three-phase inverter (31), and wherein the vector control allows an internal angle ($\Psi$) of the electrical machine to be assigned at least two different values.

11. An assemblage, comprising:
   an actuator (2) according to claim 1, and
   a vehicle transmission system (3) being a clutch,
   the clutch actuated by the motion transformation system (9) driven by the electrical machine (6).

12. The assemblage according to claim 11, wherein the clutch is one of a dry clutch, a double dry clutch, and a gearbox synchronizer.

13. A method for controlling an actuator (2) according to claim 1, comprising the step of controlling the commutation cells (41) of the static converter (31) by allowing the value of the torque constant (K) of the electrical machine (6) to be assigned at least one high value and at least one low value.

14. The method according to claim 13, wherein the step of controlling comprises the step (91) according to which the commutation cells (41) are controlled so that the torque constant (K) is assigned the high value when the actuator (2) is holding the vehicle transmission system (3) in a given state.

15. The method according to claim 13, wherein the step of controlling comprises the step (92) according to which the commutation cells (41) are controlled so that the torque constant (K) is assigned the low value in order to displace the actuator (2).

16. The method according to claim 14, wherein the vehicle transmission system (3) is a single or double clutch, wherein the vehicle transmission system (3) is in an engaged state when the actuator (2) is deactivated, and wherein the commutation cells (41) are controlled in such a way that the torque constant (K) is assigned the high value so that the actuator (2) holds the vehicle transmission system (3) in a disengaged state.

17. The method according to claim 14, wherein the vehicle transmission system (3) is a single or double clutch, wherein the vehicle transmission system (3) is in a disengaged state when the actuator (2) is deactivated, and wherein the commutation cells (41) are controlled in such a way that the torque constant (K) is assigned the high value so that the actuator (2) holds the vehicle transmission system (3) in an engaged state.

18. The method according to one of claim 13, wherein the control system (32) is configured to apply an auxiliary control to the commutation cells (41) when the control system (32) receives an information item relating to the existence of a fault.

19. The method according to claim 18, wherein the vehicle transmission system (3) is a single or double clutch, wherein the vehicle transmission system (3) is in an engaged state when the actuator (2) is deactivated, and wherein the auxiliary control acts on the commutation cells (41) of the static converter (31) in such a way that:
   the commutation cell (41) of each arm (40) connecting the neutral point (42) and a positive DC input (47) of the static converter (31) is nonconductive, and
   the commutation cell (41) of each arm (40) connecting the neutral point (42) and a negative DC input (48) of the static converter (31) is conductive, in order to brake the electrical machine (6) when the electrical machine (6) is driven by a load of the vehicle transmission system (3).

20. The method according to claim 18, wherein the vehicle transmission system (3) is a single or double clutch, wherein the vehicle transmission system (3) is in a disengaged state when the actuator (2) is deactivated, and wherein the auxiliary control acts on the commutation cells (41) of the static converter (31) so as to make all of the commutation cells (41) of the static converter (31) nonconductive, in order not to brake the electrical machine (6) when the electrical machine (6) is driven by a load of the vehicle transmission system (3).

21. An actuator for actuating a vehicle transmission system (3), the vehicle transmission system (3) being a clutch, the actuator (2) comprising:
   an electrical machine;
   a motion transformation system (9) driven by the electrical machine (6) and configured to actuate the clutch;
   a static converter comprising a plurality of commutation cells, the static converter configured to electrically connect the electrical circuit of the armature to an electrical energy source; and
   a control system for controlling the commutation cells of the static converter, the control system being configured so as to permit defluxing of the electrical machine so that the torque constant of the electrical machine is assigned at least two different values.

22. The actuator according to claim 2, wherein the static converter (31) comprises three arms (40) mounted in parallel, wherein each arm (40) comprises two commutation cells (41) in series separated from one another by a neutral point (42), and wherein each neutral point (42) allows electrical connection of the static converter (31) to the electrical circuit of the armature.

23. The actuator according to claim 22, wherein the electrical machine (6) is a DC machine comprising three brushes (51, 52, 53), and wherein each brush is connected to one of the neutral points (42) of the static converter (31).

24. The actuator according to claim 3, wherein the electrical machine (6) is a DC machine comprising three brushes (51, 52, 53), and wherein each brush is connected to one of the neutral points (42) of the static converter (31).

25. The actuator according to claim 5, wherein the control system (32) of the commutation cells (41) is configured at least to allow:
   the commutation cells (41) to be controlled so that the current (I) flowing in the electrical circuit of the armature flows both in the first brush (51) and in the second brush (52), and in a portion of the arms to whose neutral points (42) the brushes (51, 52) are connected, and
   the commutation cells (41) to be controlled so that the current (I) flowing in the electrical circuit of the armature flows both in the third brush (53) and in one of the first brush (51) and the second brush (52), and in a portion of the arms to whose neutral points (42) the brushes (51, 52, 53) are connected.

26. The actuator according to claim 6, wherein the control system (32) of the commutation cells (41) is configured at least to allow:
   the commutation cells (41) to be controlled so that the current (I) flowing in the electrical circuit of the armature flows both in the first brush (51) and in the second brush (52), and in a portion of the arms to whose neutral points (42) the brushes (51, 52) are connected, and
   the commutation cells (41) to be controlled so that the current (I) flowing in the electrical circuit of the armature flows both in the third brush (53), and in one of the first (51) and the second brush (52), and in a portion of the arms to whose neutral points (42) the brushes (51, 52, 53) are connected.

27. The actuator according to claim 7, wherein the control system (32) of the commutation cells (41) is configured at least to allow:
   the commutation cells (41) to be controlled so that the current (I) flowing in the electrical circuit of the armature flows both in the first brush (51) and in the second brush (52), and in a portion of the arms to whose neutral points (42) the brushes (51, 52) are connected, and
   the commutation cells (41) to be controlled so that the current (I) flowing in the electrical circuit of the armature flows both in the third brush (53) and in one of the first brush (51) and the second brush (52), and in a portion of the arms to whose neutral points (42) the brushes (51, 52, 53) are connected.

28. The actuator according to claim 1, wherein the motion transformation system (9) includes a linearly displaceable member (13) driven by the electrical machine (6).

* * * * *